United States Patent [19]

Schwartz

[11] Patent Number: 4,559,570
[45] Date of Patent: Dec. 17, 1985

[54] MAGNETIC STORAGE SYSTEM

[75] Inventor: David M. Schwartz, Denver, Colo.

[73] Assignee: CompuSonics Corporation, Englewood, Colo.

[21] Appl. No.: 609,765

[22] Filed: May 14, 1984

[51] Int. Cl.[4] .............................................. G11B 5/58
[52] U.S. Cl. .................................................... 360/77
[58] Field of Search .............................. 360/75, 77, 78

[56] References Cited

U.S. PATENT DOCUMENTS

| | | | |
|---|---|---|---|
| 4,149,198 | 4/1979 | Behr et al. | 360/77 |
| 4,157,576 | 6/1979 | Hack et al. | 360/77 |
| 4,348,703 | 9/1982 | Janosi | 360/77 |
| 4,363,046 | 12/1982 | Saito | 360/106 |
| 4,395,741 | 7/1983 | Kobayashi et al. | 360/77 |

OTHER PUBLICATIONS

IBM Technical Disclosure Bulletin, vol. 25, No. 2, Jul. 1982, pp. 778-779, Re-Recordable Servo System for Multi-Track Tape, T. Schwarz.
IBM Technical Disclosure Bulletin, vol. 26, No. 4, Sep. 1983, pp. 2100-2103, DC Offset Correction with Fast Recovery Mode in Write to Read Recovery Times for Sector Servo Hard Disk Files, Gruver et al.

*Primary Examiner*—George G. Stellar
*Attorney, Agent, or Firm*—Jerry Berkstresser; Bruce Klaas

[57] ABSTRACT

Disclosed is a magnetic storage system which utilizes a dual planar magnetic disk storage device in combination with a magnetic head assembly having a local tracking device for producing small correctional movements to precisely align the magnetic transducer head to provide high density recording on a magnetic disk and thereby increase the total amount of information stored on the disk. The dual planar magnetic storage disk has magnetic wall regions which are permanently magnetized with either a horizontal or vertical polarity to produce a magnetic wall on each side of the data track. The local tracking device has sensor coils for sensing the location of the magnetic transducer head and reactor coils for producing a reaction coil magnetic field which interacts with either the magnetic wall field or the magnetic head assembly to produce the correctional movements of the local tracking device.

24 Claims, 6 Drawing Figures

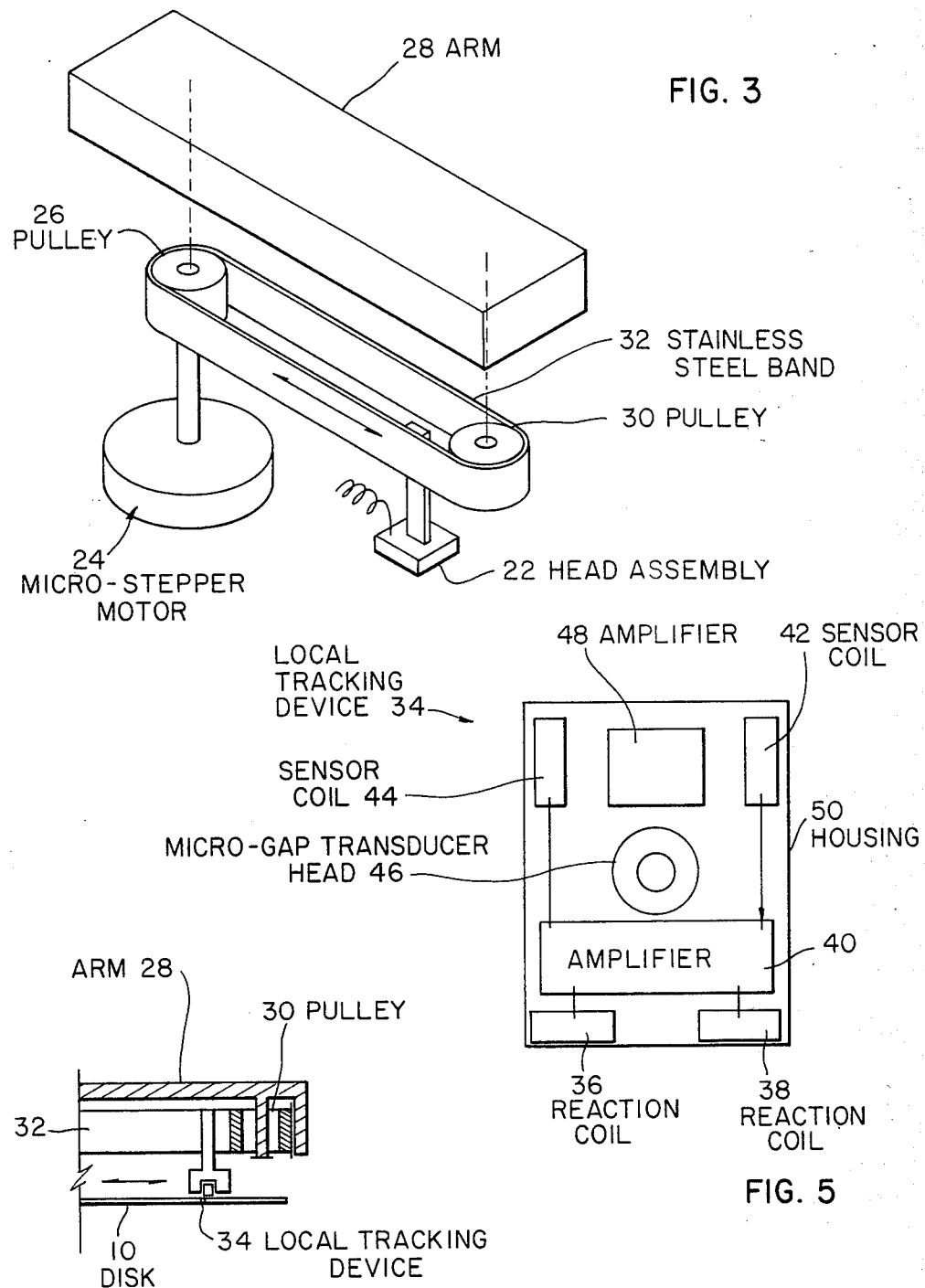

MAGNETIC STORAGE SYSTEM

BACKGROUND OF THE INVENTION

The present invention relates generally to magnetic storage systems, and more particularly to storage of magnetic data in a high density format.

With the advent of the proliferation of the computer industry there has been a need for more accurate and higher density storage of information. A prior means of storage of information in a magnetic format has been on magnetic disks on both hard disks and floppy disks. Information was typically recorded on these disks on circular recording tracks in the horizontal plane of the disk. In order to both store and retrieve the information, it was necessary to locate the position of the information on the disk and align the magnetic transducer head to read and write the information in the appropriate location. A conventional method utilized for storing magnetic data comprised the use of circular guiding tracks which were recorded on the magnetic disk which provided locational information and data information stored on the disk. An external servo mechanical positioning device was utilized to position the read/write head in accordance with information provided by the locational guiding track.

A disadvantage of such a magnetic storage system is that a large percentage of each side of the disk is dedicated solely to recording guiding tracks or sectors within tracks and cannot be used to store magnetic data information. Additionally, the mechanical link between the transducer head used for transducing magnetic data and the transducer head used for transducing guidance track information is typically insufficient to align the two transducer heads in a manner which will provide sufficient accuracy to allow storage of information in a high density format on the disk. Additionally, such systems have a slow response time due to the calculations required to locate the read/write head in the proper location. Physical separation of the guidance track transducer head and the magnetic data transducer head increases propagation time which further increases the response time in the system. Also, positioning accuracy is limited by the external servo mechanism used to locate the magnetic data transducer head due to the physical limitations of the mass and inertia of the system. This further reduces the accuracy and, consequently, the density in which magnetic data can be stored on a disk.

These disadvantages and limitations were overcome to some extent by the use of guidance or control tracks which are disposed on the same side of the disk on which magnetic data is stored. Using these systems, magnetic data can be stored on both sides of the disk to increase the total amount of information storage.

The disadvantage of these systems, however, is that the useful data capacity of the disk is still diminished to some extent by the storage of locational information on a guidance track and the total amount of stored information is limited. Furthermore, such systems are expensive in that the amount of electronic circuitry required for storing positional information is considerable.

Other methods have also been used for storing position information which have not operated with suitable reliability. For example, U.S. Pat. No. 3,753,252 describes a system whereby the track position is identified by magnetic and non-magnetic regions. To provide non-magnetic regions on the surface of the magnetic layer, an acid is allowed to effect selected regions. Again, useful data capacity is lost by the recording of locational information on a disk and the total amount of stored information is limited.

U.S. Pat. No. 3,541,270 describes a magnetic head with two air gaps in juxtaposition, magnetically insulated from one another, both extending perpendicular to the direction of the track. The signals read by each head from one half of the data bearing track are compared with one another and generate a signal for correcting the position of the magnetic head if the latter deviates from the predetermined track position. A disadvantage of this device is that transducer position control is not possible during recording. This means that known positioning methods must be used in addition to that disclosed in the patent. Irregularities in the recording medium which cause signal amplitude loss or signal fluctuations may lead to faulty positioning of the transducer.

U.S. Pat. No. 4,157,576 discloses a system which utilizes a magnetic transducer with a first air gap to transduce the data track and a second air gap to detect a reference track. The reference track comprises a transition line on the recording medium between regions of a varying magnetization. Correction signals are produced in the device by sensing the location of the transition point. This system overcomes the disadvantages of prior art systems by eliminating the physical space required for recording the guidance tracks on the magnetic disk. However, precise positioning of the magnetic data transducer head, as in other prior art devices, is limited by the accuracy of the external servo system and the ability of the air gap to sense the precise location of the transition point on the disk. As in other prior art systems, response time of the system is limited by the propagation time and the time required to form the necessary calculations to properly locate the magnetic data transducer head. The sheer mass of the system and inertia associated therewith limits the positional accuracy of the magnetic data transducer head so as to limit the density of magnetic data which can be stored on the disk.

SUMMARY OF THE INVENTION

The present invention overcomes the disadvantages and limitations of the prior art by providing a system which is capable of recording magnetic data information on a magnetic disk with high positional accuracy to provide a high density format of magnetic data and, consequently, increase the total amount of information stored on the disk. This is achieved through the use of a magnetic storage disk having locational information regions which are magnetized with a polarity which is substantially transverse to the horizontal plane of the disk to produce a magnetic wall field. A recording head assembly is positioned by support means between proper wall regions. Precise positioning of a micro-gap transducer head is then achieved by a local tracking device disposed within the recording head assembly which produces an adjustment signal in response to the magnetic wall field to precisely locate the transducer head. In this manner, high density recording of information can be achieved as a result of the ability to precisely locate the transducer head without resort to additional external circuitry.

The present invention may therefore comprise a magnetic storage apparatus capable of storing and retrieving magnetic data in a high density format comprising magnetic disk storage means for storing the magnetic data comprising magnetic wall means defining a plurality of predetermined locational information regions on the magnetic disk storage means which are magnetized with a polarity having a first predetermined direction to produce a magnetic wall field; data track means defining a plurality of predetermined horizontal magnetic data storage regions for storing the magnetic data with a polarity having a second predetermined direction which is substantially normal to the first predetermined direction; magnetic head assembly means for storing and retrieving the magnetic data from the data track means comprising magnetic transducer head means for recording and retrieving the magnetic data stored on the data track means with a polarity in the second predetermined direction which is substantially normal to the first predetermined direction; housing means for supporting the magnetic transducer head means; sensor coil means for producing a sensor coil locational signal representative of the location of the magnetic transducer head means relative to the magnetic wall means; means for amplifying the sensor coil locational signal; reaction coil means for adjusting the position of the magnetic transducer head means within the housing means to precisely align the magnetic transducer head means on the data track means by generating a reaction coil magnetic field which interacts with the magnetic wall field to move the magnetic transducer head means in the housing means; support means for positioning the magnetic head assembly means on the magnetic disk storage means.

The present invention may also comprise a magnetic storage apparatus capable of storing and retrieving magnetic data in a high density format comprising magnetic disk storage means for storing the magnetic data comprising magnetic wall means defining a plurality of predetermined locational information regions on the magnetic disk storage means which are magnetized with a polarity having a first predetermined direction to produce a magnetic wall field; data track means defining a plurality of predetermined magnetic data storage regions for storing the magnetic data with a polarity having a second predetermined direction which is substantially normal to the first predetermined direction; magnetic head assembly means for storing and retrieving the magnetic data from the data track means comprising magnetic transducer head means for recording and retrieving the magnetic data stored on the data track means with a polarity in the second predetermined direction; housing means for supporting the magnetic transducer head means; sensor coil means for producing a sensor coil locational signal representative of the location of the magnetic transducer head means relative to the magnetic wall means; means for amplifying the sensor coil locational signal; reaction coil means for adjusting the position of the magnetic transducer head means within the housing means to precisely align the magnetic transducer head means on the data track means by generating a reaction coil magnetic field which interacts with the housing means in response to the sensor coil locational signal; support means for positioning the magnetic head assembly means on the magnetic disk storage means.

The present invention may also comprise an apparatus for storing magnetic data comprising dual planar magnetic disk storage means having a plurality of magnetized wall regions having a predetermined direction of polarity and a plurality of data tracks disposed between the wall regions; magnetic head assembly means for recording and retrieving the magnetic data on the data tracks comprising magnetic transducer means for reading and writing the magnetic data on the data tracks with a direction of polarity substantially normal to the direction of polarity of the magnetized wall regions; sensor coil means for sensing the location of magnetic transducer means with respect to the magnetized wall regions; reaction coil means for producing a reaction coil magnetic field to adjust the position of said magnetic transducer means in response to the position of the magnetic transducer means sensed by the sensor coil means.

OBJECTS OF THE INVENTION

It is therefore an object of the present invention to provide an improved magnetic storage apparatus.

It is also an object of the present invention to provide a magnetic storage apparatus capable of storing and retrieving magnetic data in a high density format.

Another object of the present invention is to provide an apparatus for storing magnetic data which has a fast response time.

Additional objects, advantages and novel features of the invention are set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings wherein:

FIG. 3 is a schematic view of an arm assembly.

FIG. 4 is a detailed sectional view of the arm assembly of FIG. 3.

FIG. 5 is a schematic plan view of the head assembly of the present invention.

DETAILED DESCRIPTION OF THE PREFERRED EMBODIMENT OF THE INVENTION

Figure 1:
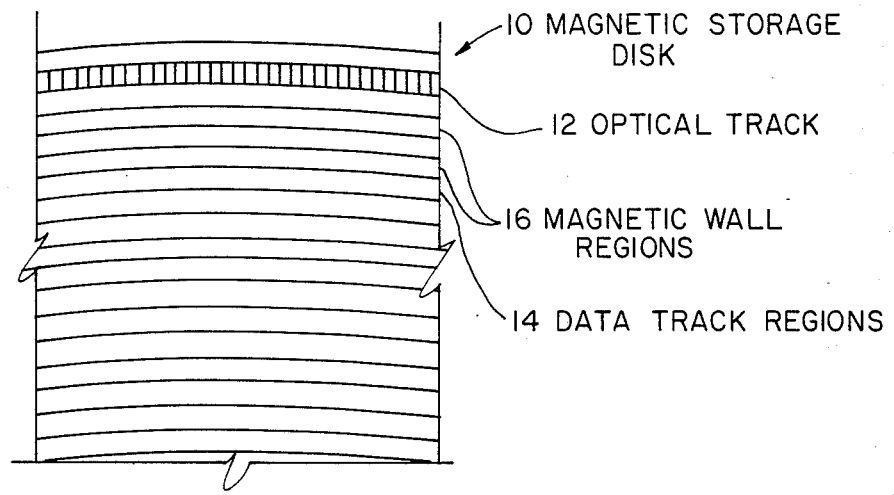
FIG. 1 is a schematic view of a section of a magnetic disk illustrating the manner in which the magnetic disk is magnetized and recorded.

FIG. 1 is a plan view illustrating the media stored on the magnetic storage disk 10 of the present invention. Optical track 12 is disposed along the periphery of the magnetic storage disk 10 to provide a means for operating the magnetic storage disk 10 at a predetermined rotational speed. A series of data tracks 14 are disposed between a series of magnetic walls 16 which form concentric circular tracks around the magnetic storage disk 10. Both the magnetic wall 16 and data tracks 14 can be also be formed in a spiral configuration on a magnetic storage disk 10. As illustrated in FIG. 1, a range of 500 to 25,000 tracks per inch can be placed on the magnetic storage disk 10.

Figure 2:
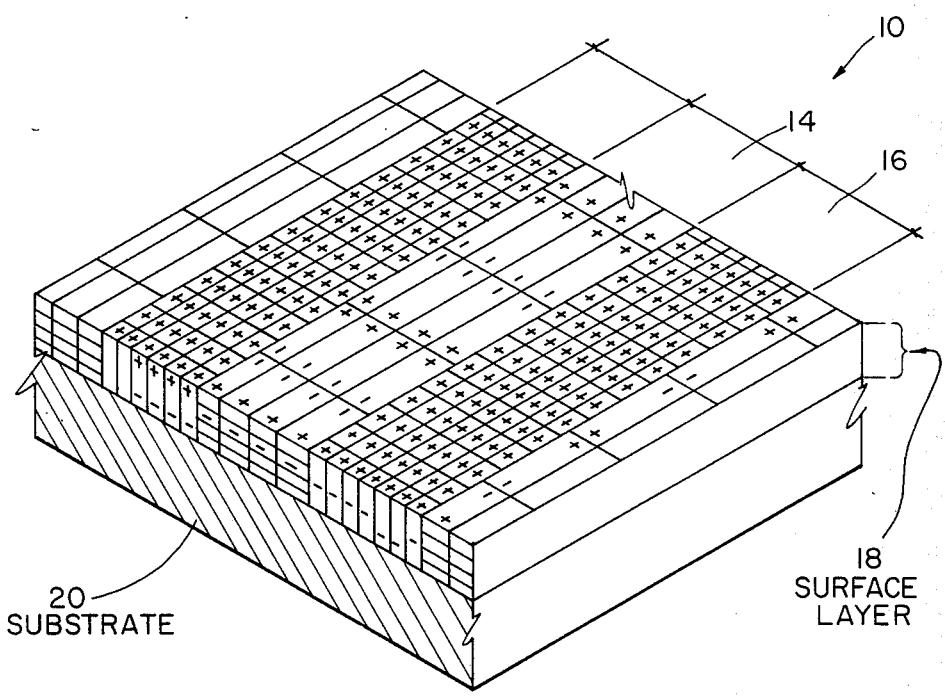
FIG. 2 is an exploded schematic view of a section of the magnetic disk illustrating the polarity of the magnetic walls and data tracks.

FIG. 2 is a perspective sectional view of magnetic storage disk 10 illustrating the polarity of magnetization of the media. Magnetic wall 16 defines a series of tracks along the surface layer 18 of the magnetic storage disk 10. Magnetic wall 16 comprises magnetically charged particles which are prerecorded in the manufacturing stage and are permanently charged at the highest level which the magnetic media can sustain, for example, 1200 Oerstads. Surface layer 18 is disposed on a substrate 20 which supports the magnetic wall regions 16 and data track regions 14. Recordable data tracks 14 are disposed between magnetic wall means 16 along the surface layer 18 of the magnetic storage disk 10. Data tracks 14 can be recorded with a horizontal polarity, as illustrated in FIG. 2 or a vertical polarity. Similarly magnetic wall regions 16 can be magnetized either horizontally or vertically as long as the data tracks 14 and the magnetic wall regions have directions of polarity which are substantially normal to one another. Disk media, which can be magnetized either horizontally or vertically, have been disclosed by Eastman Kodak Company, Spin Physics Division, San Diego, Calif., in an article entitled "Isotropic Recording Media". Data tracks 14 are eraseable data tracks which can be rerecorded or erased. Magnetic wall means 16 produces a magnetic wall field on each side of data track 14 to provide a locational field for data track 14.

FIG. 3 comprises a schematic isometric view of the arm assembly of the present invention which functions to move the recording head assembly 22 to the proper position on magnetic storage disk 10. Micro-stepper motor 24 functions to move pulley 26, which is attached to arm 28, in a step-wise fashion to move stainless steel band 32 in either of two lateral directions. Stainless steel band 32 rotates on idler pulley 30 and head assembly 22 is attached to the stainless steel band to position head assembly 22 in accordance with servo motor control signals applied to microstepper motor 24. The arm assembly device illustrated in FIG. 3 comprises a conventional device for locating a head assembly on a magnetic storage disk. As set forth above, exact positioning of the transducer head with a high degree of precision cannot be achieved utilizing a conventional arm assembly, as illustrated in FIG. 3, due to the inherent inaccuracies and inertia of the arm assembly system. This applies to a lesser degree to voice coil actuated conventional arm assemblies, but is still true.

FIG. 4 is a detailed cross-sectional view of a portion of the arm assembly illustrated in FIG. 3. As shown in FIG. 4, head assembly 22 is attached to positional band 32 which provides a gross movement of head assembly 22 on disk 10. Arm 28 supports pulley 30 to provide the required movement of positional band 32. As illustrated in FIG. 4, a local tracking device (LTD) carrier 34 is mounted in head assembly 22 to provide exact positioning of the transducer head. The micro-stepper motor 24 locates the head assembly 22 on the desired track between the magnetic wall field 16. Once the desired track is selected by gross movement of the microstepper motor, precise positioning of the transducer head, which is required to maintain tracking between magnetic wall field 16, is achieved by the local tracking device.

FIG. 5 is a plan view of the local tracking device illustrated in FIG. 4. Local tracking device 34 comprises a pair of sensor coils 42, 44 which are positioned on local tracking device 34 to sense the magnitude of adjacent magnetic wall fields produced by magnetic wall means 16 on magnetic storage disk 10. Typically, sensor coils 42, 44 are located adjacent the lower surface of local tracking device 34 to provide an accurate sensor coil location signal which is representative of the location of local tracking device 34 relative to the magnetic wall means 16. Each of the sensor coil locational signals is amplified in amplifier 40 mounted directly on local tracking device 34 and applied to reactor coils 36, 38. Reactor coils 36, 38 generate a reaction coil magnetic field which interacts with the magnetic wall field of magnetic wall means 16, or with housing means 50, to move the micro-gap of transducer head 46 within housing means 50. Transducer head 46 comprises a micro-gap read/write transducer device which is capable of recording magnetic data in a high density format. Read/write signals received from and applied to transducer head 46 are amplified in amplifier 48 which is mounted directly on local tracking device 34 to minimize propagation time losses.

Figure 6:
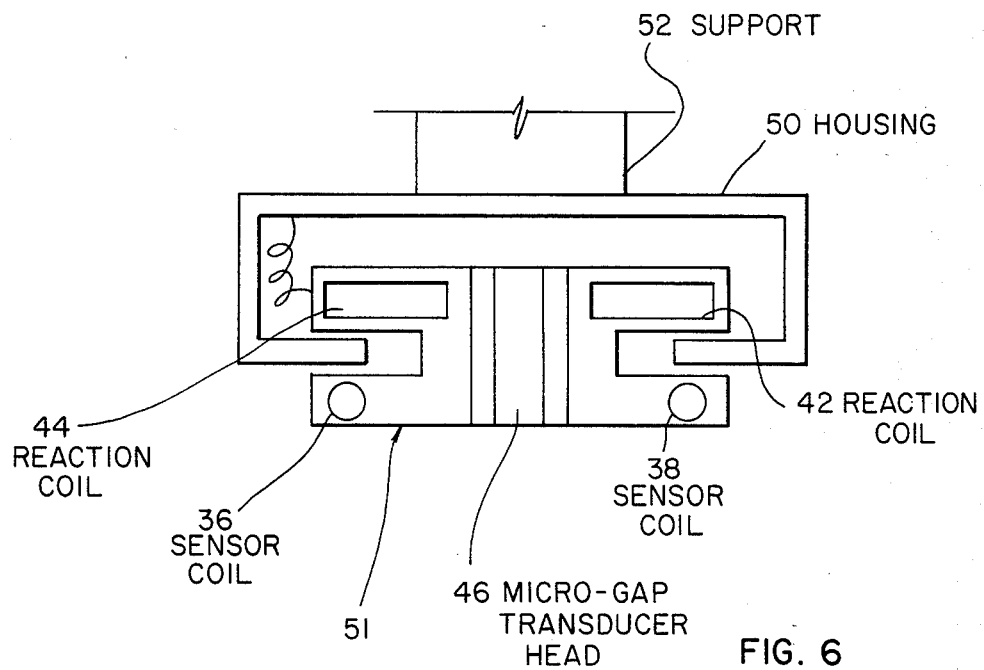
FIG. 6 is a schematic cross-sectional view of the head assembly illustrated in FIG. 5.

FIG. 6 is a cross-sectional view of the local tracking device 34 illustrated in FIG. 5. As illustrated in FIG. 6 sensor coils 36, 38 are located in a monolithic crystalline chip 51 and adjacent the lower portion of the local tracking device 34 (FIGS. 4 and 5) to detect magnetic wall fields produced by magnetic wall 16. Reaction coils 42, 44 are located in housing means 50 and produce a correctional movement of the local tracking device 34 by producing a reaction coil magnetic field which interacts with either the magnetic wall field or housing 50. The local tracking device 34 functions basically as a servo mechanism that senses movement and reacts with an opposite movement. Sensor coils 36, 38 of local tracking device 34 sense relative movement of the local tracking device 34 with respect to the magnetic wall fields. The signal generated by the lateral relative movement of the local tracking device is amplified by amplifier 40, as set forth above, to produce a corrective movement of the local tracking device. The precise alignment produced by movement of the local tracking device is achieved independently of the gross movement produced by the micro-stepper motor positioning device. In this manner, precise alignment of the micro-gap transducer head can be produced to achieve greater accuracy of recording of magnetic data, and thereby produce recording in a higher density format to greatly increase the total amount of information stored on the disk. Micro-gap transducer head 46 interacts with the dual planar magnetized disk 10 to achieve either horizontal or vertical recording of magnetic data.

The local tracking device can be retro-fitted onto existing magnetic head assemblies and can be constructed of a size ranging from 0.10 inches in width to 0.01 inches in width. Alternatively, the data track can be either horizontally magnetized or vertically magnetized, as set forth above, as long as the wall tracks have a polarity of magnetization which is substantially normal to the polarity of the data track.

The local tracking device comprises a monolithic assembly with low relative mass to provide fast response times and negate the effects of inertia. Construction techniques for the local tracking device 34 and housing means 50 are disclosed in an article entitled "MicroMechanical Devices", by James B. Angell, Stephan C. Terry, and Philip W. Barth of Stanford University.

Consequently, the present invention provides a magnetic recording system which is capable of storing magnetic data in a high density format which has not been achievable in prior art devices. The present system uses a local tracking device which produces small correctional movements to precisely align a micro-gap transducer head for high density format recording of magnetic data. Alignment of the local tracking device is achieved by the use of sensor coils which produce sensor coil locational signals representative of the location of the magnetic transducer head relative to the magnetic wall fields. Magnetic data recording and magnetic wall recording can be produced either horizontally or vertically, but must have opposite directions of polarity. The local tracking device utilizes a monolithic design with low mass to increase response time of the system. Reaction coils and sensor coils, as well as amplifiers, are placed directly within the local tracking device to decrease response time of the correctional movements produced by the local tracking device 34.

The foregoing description of the invention has been presented for purposes of illustration and description. It is not intended to be exhaustive or to limit the invention to the precise form disclosed. Other modifications and variations may be possible in light of the above teachings. The embodiment was chosen and described in order to best explain the principles of the invention in a practical application to thereby enable others skilled in the art to best utilize the invention in various embodiments and various modifications as are suited to the particular use contemplated. It is intended that the appended claims be construed to include other alternatives and embodiments of the invention except and insofar as limited by the prior art.

What is claimed is:

1. A magnetic storage apparatus capable of storing and retrieving magnetic data in a high density format comprising:
    magnetic disk storage means for storing said magnetic data comprising:
        magnetic wall means defining a plurality of predetermined locational information regions on said magnetic disk storage means which are magnetized with a polarity having a first predetermined direction to produce a magnetic wall field;
        data track means defining a plurality of predetermined horizontal magnetic data storage regions for storing said magnetic data with a polarity having a second predetermined direction which is substantially normal to said first predetermined direction;
    magnetic head assembly means for storing and retrieving said magnetic data from said data track means comprising:
        magnetic transducer head means for recording and retrieving said magnetic data stored on said data track means with a polarity in said second predetermined direction;
        housing means for supporting said magnetic transducer head means;
        sensor coil means for producing a sensor coil locational signal representative of the location of said magnetic transducer head means relative to said magnetic wall means;
        means for amplifying said sensor coil locational signal;
        reaction coil means for adjusting the position of said magnetic transducer head means within said housing means to precisely align said magnetic transducer head means on said data track means by generating a reaction coil magnetic field which interacts with said magnetic wall field to move said magnetic transducer head means in said housing means;
    support means for positioning said magnetic head assembly means on said magnetic disk storage means.

2. The apparatus of claim 1 wherein said means for amplifying said sensor coil location signal is disposed on said magnetic head assembly to reduce propagation time of said sensor coil locational signal to said reaction coil means and increase the response time of movement of said magnetic transducer head.

3. The apparatus of claim 2 wherein said magnetic head assembly means comprises a monolithic structure.

4. The apparatus of claim 3 wherein said magnetic transducer head means comprises a thin film micro-gap read/write head.

5. The apparatus of claim 3 wherein said magnetic transducer head means comprises a ferrite core micro-gap read/write head.

6. The device of claim 3 wherein said magnetic head assembly further comprises:
    signal amplification means for amplifying signals transduced by said magnetic transducer head means.

7. The device of claim 6 wherein said first predetermined direction is substantially parallel to the direction of movement of said magnetic disk storage means and said second predetermined direction is substantially normal to the surface plane of said magnetic disk storage means.

8. The device of claim 6 wherein said first predetermined direction is substantially normal to the surface plane of said magnetic disk storage means and said second predetermined direction is substantially parallel to said direction of movement of said magnetic disk storage means.

9. The apparatus of claim 7 wherein said magnetic transducer head means comprises a thin film micro-gap read/write head.

10. The apparatus of claim 7 wherein said magnetic head assembly means comprises a ferrite core micro-gap read/write head.

11. The apparatus of claim 8 wherein said magnetic transducer head means comprises a thin film micro-gap read/write head.

12. The apparatus of claim 8 wherein said magnetic head assembly means comprises a ferrite core micro-gap read/write head.

13. The device of claim 4 wherein said magnetic head assembly further comprises:
    signal amplification means for amplifying signals transduced by said magnetic transducer head means.

14. The device of claim 5 wherein said magnetic head assembly further comprises:
    signal amplification means for amplifying signals transduced by said magnetic transducer head means.

15. A magnetic storage apparatus capable of storing and retrieving magnetic data in a high density format comprising:
    magnetic disk storage means for storing said magnetic data comprising:
        magnetic wall means defining a plurality of predetermined locational information regions on said magnetic disk storage means which are magnetized with a polarity having a first predetermined direction to produce a magnetic wall field;
        data track means defining a plurality of predetermined magnetic data storage regions for storing said magnetic data with a polarity having a second predetermined direction which is substantially normal to said first predetermined direction;

magnetic head assembly means for storing and retrieving said magnetic data from said data track means comprising:

magnetic transducer head means for recording and retrieving said magnetic data stored on said data track means with a polarity in said second predetermined direction;

housing means for supporting said magnetic transducer head means;

sensor coil means for producing a sensor coil locational signal representative of the location of said magnetic transducer head means relative to said magnetic wall means;

means for amplifying said sensor coil locational signal;

reaction coil means for adjusting the position of said magnetic transducer head means within said housing means to precisely align said magnetic transducer head means on said data track means by generating a reaction coil magnetic field which interacts with said housing means in response to said sensor coil locational signal;

support means for positioning said magnetic head assembly means on said magnetic disk storage means.

16. The apparatus of claim 15 wherein said means for amplifying said sensor coil location signal is disposed within said magnetic head assembly to reduce propagation time of said sensor coil locations signal to said reaction coil means and increase the response time of movement of said magnetic transducer head.

17. The apparatus of claim 16 wherein said magnetic head assembly means comprises a monolithic structure.

18. The apparatus of claim 17 wherein said magnetic transducer head means comprises a thin film micro-gap read/write head.

19. The apparatus of claim 17 wherein said magnetic head assembly means comprises a ferrite core micro-gap read/write head.

20. The device of claim 17 wherein said magnetic head assembly further comprises:

a signal amplification means for amplifying signals transduced by said magnetic transducer head means.

21. The apparatus of claim 20 wherein said reaction coil means are disposed within said housing means.

22. The device of claim 20 wherein said first predetermined direction is substantially parallel to the plane of movement of said magnetic disk storage means and said second predetermined direction is substantially normal to said plane of movement of said magnetic disk storage means.

23. The device of claim 20 wherein said first predetermined direction is substantially normal to the surface plane of said magnetic disk storage means and said second predetermined direction is substantially parallel to said direction of movement of said magnetic disk storage means.

24. An apparatus for storing magnetic data comprising:

dual planar magnetic disk storage means having a plurality of magnetized wall regions having a predetermined direction of polarity and a plurality of data tracks disposed between said wall regions;

magnetic head assembly means for recording and retrieving said magnetic data on said data tracks comprising:

magnetic transducer means for reading and writing said magnetic data on said data tracks with a direction of polarity substantially normal to the direction of polarity of said magnetized wall regions;

sensor coil means for sensing the location of magnetic transducer means with respect to said magnetized wall regions;

reaction coil means for producing a reaction coil magnetic field to adjust the position of said magnetic transducer means in response to the position of said magnetic transducer means sensed by said sensor coil means.

* * * * *